July 9, 1940.　　　　J. W. BUTLER　　　　2,207,578
CONTROL SYSTEM FOR AND METHOD OF CONTROLLING SYNCHRONOUS MACHINES
Original Filed Nov. 24, 1937
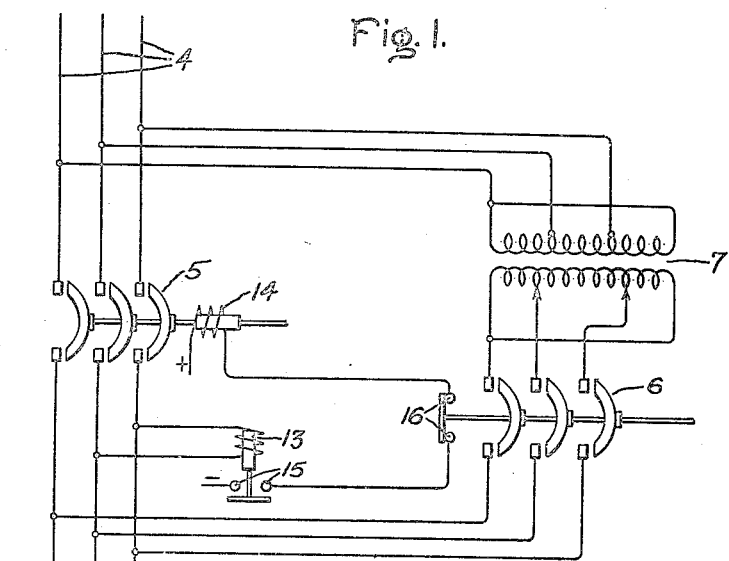
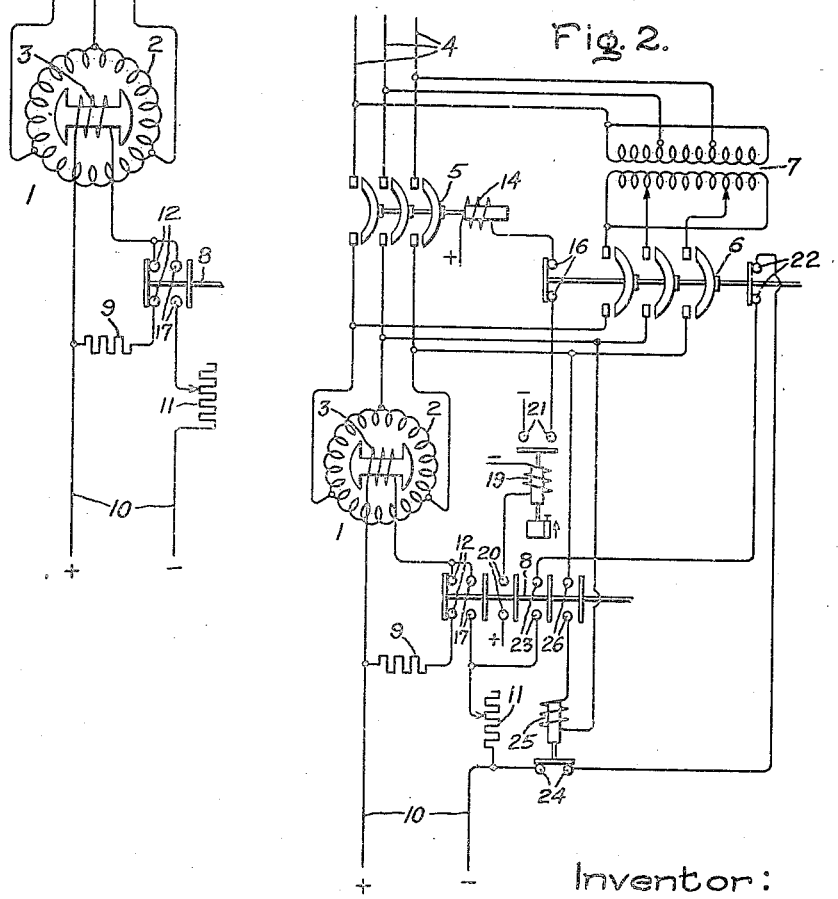
Inventor:
John W. Butler,
by Harry E. Dunham
His Attorney.

Patented July 9, 1940

2,207,578

UNITED STATES PATENT OFFICE 2,207,578

CONTROL SYSTEM FOR AND METHOD OF CONTROLLING SYNCHRONOUS MACHINES

John W. Butler, Schenectady, N. Y., assignor to General Electric Company, a corporation of New York Application November 24, 1937, Serial No. 176,274
Renewed December 6, 1939

4 Claims. (Cl. 172—274)

My invention relates to a control system for, and a method of, controlling synchronous machines and particularly to a system for, and a method of, controlling the transfer from the reduced voltage primary connections to the full voltage primary connections of a reduced voltage started synchronous machine.

One object of my invention is to provide an improved arrangement of apparatus and an improved method for effecting the transfer from the reduced voltage starting to the full voltage running primary connections of a synchronous machine with practically no disturbance in the electrical condition of the supply circuit.

My invention will be better understood from the following description when taken in connection with the accompanying drawing, Fig. 1 of which diagrammatically illustrates a synchronous motor starting system embodying my invention, and Fig. 2 illustrates a modification of the system shown in Fig. 1, and its scope will be pointed out in the appended claims.

Referring to Fig. 1 of the drawing, 1 represents a synchronous machine such as a synchronous condenser or motor having a polyphase armature winding 2 and a field winding 3. The armature winding 2 is arranged to be connected directly to a polyphase supply circuit by suitable switching means 5. 6 represents a suitable switch for connecting the armature winding 2 to the low voltage secondary winding of a step-down transformer 7, the primary winding of which is connected to the supply circuit 4. 8 represents a two-position field switch which in one position connects through its contacts 12 a discharge resistor 9 across the terminals of the field winding 3 and which in its other position connects through its contacts 17 a source of excitation 10 and a suitable adjustable rheostat 11 in series across the terminals of the field winding 3.

In accordance with my invention, I overexcite the field winding 3 while the starting primary connections are established and then effect the transfer from the starting to the running primary connections of the machine 1 only after the starting switch 6 has been opened long enough to allow the overexcited field winding 3 to build the terminal voltage of the disconnected machine up to a value substantially equal to the normal running voltage that is supplied to the armature winding 2 from the supply circuit 4. In the particular embodiment of my invention shown in the drawing, this result is accomplished by providing a voltage relay 13 across the terminals of one phase of the armature winding 2 and having this relay control the circuit of the closing coil 14 of the switch 5 so that this closing coil is energized to effect the closing of the switch 5 only when the switch 6 is open and the terminal voltage of the machine 1 is approximately equal to the supply circuit voltage.

The operation of the arrangement shown in the drawing is as follows: When it is desired to start the motor 1, the starting switch 6 is closed while the field switch 8 is in the position shown in the drawing. The relatively low voltage impressed across the armature winding 2 by the secondary winding of the transformer 7 causes the machine 1 to start from rest and accelerate to substantially synchronous speed as an induction motor. When the machine 1 reaches a speed near synchronous speed, the field switch 8 is operated in any suitable manner so that the source of excitation 10 and the adjustable rheostat 11 are connected in series with the field winding 3 to pull the machine into synchronism. The rheostat 11 is adjusted so that the machine is overexcited and an armature terminal voltage equal to or greater than the supply circuit voltage is produced before the rotor of the machine has time to drop back materially from its synchronous position when the machine is disconnected from the supply circuit during the transfer from the starting to the running primary connections. When it is desired to effect this transfer in the primary connections after the machine has been synchronized, the switch 6 is opened to disconnect the armature winding 2 from the secondary winding of the transformer 7. Due to the fact that the machine is overexcited, the terminal voltage of the machine starts to increase as soon as the switch 6 is opened, and after a predetermined time, dependent upon the constants of the machine circuits, the terminal voltage reaches a value sufficient to operate the relay 13. By closing its contacts 15, the relay 13 completes, through contact 16 of the open starting switch 6, an energizing circuit for the closing coil 14 of the running switch 5 so that this switch is closed to connect the armature winding 2 directly to the supply circuit 4. By applying the proper value of overexcitation to the field winding 3, it is evident that the terminal voltage of the machine can be brought up to a value equal to the supply circuit voltage before the rotor of the machine has dropped back far enough to produce a material difference in the phase angle between the machine terminal voltage and the supply circuit voltage by the time the switch 5 is closed. Therefore, by means of my improved arrangement, I am able to effect the transfer from the starting to the running primary connections without any material voltage disturbances being produced in the supply circuit 4.

In the modification of Fig. 1, shown in Fig. 2, the voltage relay 13 is replaced by a time relay 19, the energizing circuit of which is completed by the contacts 20 on the field switch 8 when it is in its closed position. The setting of the time relay 19 is adjusted so that its time of operation is just long enough to allow the armature terminal voltage to build up to a predetermined value by the time the relay contacts 21 are closed to complete an energizing circuit for the closing coil 14 of the running breaker 5.

Also in order to reduce the time required for the armature terminal voltage to build up to the desired value after the starting breaker 6 is opened, it may be desirable in some instances to effect an increase in the excitation of the motor 1 in response to the opening of the circuit breaker 6 when the field switch 8 is closed. In Fig. 2 this result is accomplished by connecting the normally closed contacts 22 of the starting breaker 6 and the normally open contacts 23 of the field switch 8 in series in a low impedance shunt circuit around the field circuit resistor 11. This shunt circuit also includes the contacts 24 of a voltage relay 25, the operating winding of which is arranged to be connected across one phase of the motor armature winding by the contacts 26 of the field switch 8 when it is in its closed position. When the switch 6 is opened, after the field switch 8 has been closed, the resistor 11 is short circuited to increase the motor excitation until the armature terminal voltage increases to such a value that the relay 25 opens its normally closed contacts 24 in the shunt circuit around the resistor 11. The relay 25 then functions as a voltage regulator to maintain the voltage of the generator at a predetermined value.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a source of relatively low voltage, a source of relatively high voltage, a synchronous machine having an armature winding and a field winding, switching means for connecting said source of relatively low voltage to said armature winding, other switching means for connecting said source of relatively high voltage to said armature winding, means for overexciting said field winding, and means dependent upon the terminal voltage of said armature winding building up to a predetermined value in excess of the voltage of said low voltage source while said armature winding is disconnected from the said source of relatively low voltage and said field winding is overexcited for effecting the operation of the last mentioned switch to connect said armature winding to said source of relatively high voltage.

2. In combination, a source of relatively low voltage, a source of relatively high voltage, a synchronous machine having an armature winding and a field winding, switching means for connecting said source of relatively low voltage to said armature winding, other switch means for connecting said source of relatively high voltage to said armature winding, means for overexciting said field winding, and means dependent upon the terminal voltage of said armature winding building up to a predetermined value in excess of the voltage of said low voltage source and the position of said first mentioned switching means for effecting the operation of said other switching means to connect said armature winding to said source of relatively high voltage when the armature terminal voltage of said machine is above a predetermined value and said first mentioned switching means is open.

3. In combination, a synchronous machine having an armature winding and a field winding, a low voltage source, means for connecting said source to and sequentially disconnecting said source from said armature winding, means for exciting said field winding with direct current while said armature winding is connected to said source and for maintaining said field winding excited with direct current after said armature winding is disconnected from said source, a high voltage source and means responsive to the disconnection of said armature winding from said low voltage source and to a predetermined armature terminal voltage in excess of the voltage of said low voltage source while said armature winding is disconnected from said low voltage source for effecting the connection of said armature winding to said high voltage source.

4. In combination, a synchronous machine having an armature winding and a field winding, a low voltage source, means for connecting said source to and sequentially disconnecting said source from said armature winding, means for exciting said field winding with direct current while said armature winding is connected to said source and for maintaining said field winding excited with direct current after said armature winding is disconnected from said source, a high voltage source, a relay responsive to the terminal voltage of said armature winding while it is disconnected from said low voltage source and means controlled by said relay for effecting the connection of said armature winding to said high voltage source in response to the terminal voltage of said armature winding increasing to a predetermined value above the voltage of said low voltage source after said armature winding is disconnected from said low voltage source.

JOHN W. BUTLER.